United States Patent
Al-Nakhli et al.

(10) Patent No.: US 11,168,245 B2
(45) Date of Patent: Nov. 9, 2021

(54) HEAVY OIL AS FRACTURING FLUID TO INCREASE HYDRAULIC FRACTURING EFFICIENCY

(71) Applicants: Saudi Arabian Oil Company, Dhahran (SA); King Fahd University of Petroleum and Minerals, Dhahran (SA)

(72) Inventors: Ayman Al-Nakhli, Dhahran (SA); Mohamed Ahmed Nasr El Din Mahmoud, Dhahran (SA); Arqam Muqtadir, Dhahran (SA)

(73) Assignees: SAUDI ARABIAN OIL COMPANY, Dhahran (SA); KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 1 day.

(21) Appl. No.: 16/716,935

(22) Filed: Dec. 17, 2019

(65) Prior Publication Data

US 2021/0179928 A1  Jun. 17, 2021

(51) Int. Cl.
*C09K 8/64* (2006.01)
*E21B 43/26* (2006.01)
(Continued)

(52) U.S. Cl.
CPC .............. *C09K 8/64* (2013.01); *E21B 43/129* (2013.01); *E21B 43/26* (2013.01)

(58) Field of Classification Search
CPC .......... C09K 8/68; C09K 8/584; C09K 8/665; C09K 8/64; E21B 43/26; E21B 43/2405;
(Continued)

(56) References Cited

U.S. PATENT DOCUMENTS 3,477,512 A  11/1969  Siegele
3,552,494 A * 1/1971  Kiel .......................... C09K 8/64
                                                              166/308.4

(Continued)

FOREIGN PATENT DOCUMENTS

CN   105464639 A     4/2016
CN   107523285 A    12/2017
CN   108915654 A *  11/2018

OTHER PUBLICATIONS

Detoumay et al., "Fracture-Mechanics Analysis of the Breakdown Process in Minifracture or Leakoff Test," SPE Production & Facilities, pp. 195-199, Aug. 1997.

(Continued)

*Primary Examiner* — Zakiya W Bates
(74) *Attorney, Agent, or Firm* — Bracewell LLP; Constance G. Rhebergen; Kevin R. Tamm

(57) ABSTRACT

Compositions, systems, and methods for hydraulically fracturing a hydrocarbon-bearing formation, a method including injecting into the hydrocarbon-bearing formation under increased pressure a heavy oil fracturing fluid; allowing the heavy oil fracturing fluid to remain in situ for a period of time suitable to create fractures in the hydrocarbon-bearing reservoir, the heavy oil fracturing fluid operable to undergo an at least about 70% viscosity decrease in situ; and flowing back the heavy oil fracturing fluid to the surface without damaging the hydrocarbon-bearing formation or reducing production of hydrocarbons from the hydrocarbon-bearing formation.

19 Claims, 7 Drawing Sheets

(51) Int. Cl.
*E21B 43/267* (2006.01)
*E21B 43/12* (2006.01)

(58) Field of Classification Search
CPC ............... E21B 43/267; E21B 43/2406; E21B 43/2408; E21B 43/24
See application file for complete search history.

(56) References Cited

U.S. PATENT DOCUMENTS

| | | | |
|---|---|---|---|
| 3,601,198 A * | 8/1971 | Ahearn | C09K 8/64 166/308.4 |
| 5,633,220 A | 5/1997 | Cawiezel et al. | |
| 8,450,248 B2 | 5/2013 | Horton | |
| 2010/0252259 A1 | 10/2010 | Horton | |

OTHER PUBLICATIONS

Gomaa et al., "New Insights into Shale Fracturing Treatment Design," SPE 167754, pp. 1-15, 2014.
Kennedy et al., "Optimized Shale Resource Development: Proper Placement of Wells and Hydraulic Fracture Stages," SPE 162534, pp. 1-24, 2012.
Muqtadir et al., "Effect of the Type of Fracturing Fluid on the Breakdown Pressure of Tight Sandstone Rocks," SPE-192365-MS, pp. 1-15, 2018.
Pye et al., "Fluid Loss Additive Seriously Reduces Fractures Proppant Conductivity and Formation Permeability," Society of Petroleum Engineers of AIME, SPE 4680, 1973.
Wang et al., "Waterless fracturing technologies for unconventional reservoirs-opportunities for liquid nitrogen," Journal of Natural Gas Science and Engineering, 35, pp. 1-37, Sep. 1, 2016.
International Search Report and Written Opinion for PCT Application No. PCT/US2020/065589 dated Apr. 13, 2021.
Tariq et al., "An Experimental Study to Reduce the Fracture Pressure of High Strength Rocks Using a Novel Thermochemical Fracturing Approach", Hindawi, Geofluids, vol. 2019, Article ID 1904565, 16 pages, 2019.

* cited by examiner

HEAVY OIL AS FRACTURING FLUID TO INCREASE HYDRAULIC FRACTURING EFFICIENCY

BACKGROUND

Field

The present disclosure relates to heavy oil based hydraulic fracturing fluids for use with hydrocarbon-bearing reservoirs.

Description of the Related Art

Hydraulic fracturing of hydrocarbon-bearing reservoirs (also referred to as fracking), such as oil and gas reservoirs, with increased-pressure fluids generally requires certain fluid properties. The fracturing fluid should be viscous enough to be injected in the wellbore at increased pressures, for example, enough pressure to fracture a hydrocarbon-bearing rock formation, which is under increased pressure that increases with depth underground. After fractures are created, fractures tend to close due to in situ stresses. Therefore, a fracturing fluid generally should be able to carry propping agents (proppants), for example, sand. Propping agents are used to prevent fractures from closing after fracking.

Hydraulic fracturing is performed in both conventional and unconventional hydrocarbon reservoirs to enhance production. Created fractures serve as open channels for hydrocarbons to move faster from the reservoir towards a producing wellbore, thus increasing production. Currently, many varieties of viscous water-based fluids are used to fracture formations. However, these fluids require greatly increased pressures to induce fractures in formations, and after fractures are created, the invasion of such fluids can cause formations to be permanently damaged resulting in dead wells.

After a fracture is created, fracturing fluid generally is flowed out of the reservoir and should not remain in the wellbore or reservoir and block the formation. Therefore, viscosity control is important as the fluid must be able to flow back out of the well. Complex fracturing fluids generally include several ingredients like carrier fluid (water or oil-based substance) along with various additives to achieve desirable properties of the fluid. Some of these additives include, for example, gelling agents, crosslinkers, breakers, proppants, and clay stabilizers. Fracturing fluids are also intended to be environmentally-friendly, safe to personnel, and easy to prepare in harsh environments.

Water-based fracturing fluids are widely used since they are environment friendly. However, the fractures created are narrow and tend to close after the fracturing job is complete. Proppant is inefficiently carried by the fluid due to its viscosity. Hence, sufficient proppant generally is not placed in generated fractures, causing them to close due to improper proppant placement. Linear gel is another water-based fluid with a greater viscosity and better proppant placement over traditional water-based fluids, but it is still insufficient for most applications.

Water-based crosslinked fluids have greater viscosity which provides advantageous proppant placement. However, when fractures are created and the proppant placed, remaining crosslinked gels settle in the fractures and are difficult to remove. Hence, the communication of hydrocarbons, such as gas and oil between rock and the wellbore, is lost due to clogged fractures. Water also interacts with the formation and damages relative permeability to hydrocarbons in the form of clay swelling, dissolution, water blocking, emulsion formation, and precipitation. Negative effects are further amplified in unconventional reservoirs that have reduced permeability and porosity compared to conventional reservoirs.

To overcome these challenges oil-based fracturing fluids were introduced. However, commercially-available oil-based fracturing fluids suffer from many issues and are insufficient to address all hydraulic fracturing needs and situations. Commercially-available oil-based fracturing fluids are limited in the ability to meet needs of fracking formations.

SUMMARY

Applicant has recognized a need for compositions, systems, and methods for heavy oil hydraulic fracturing in which viscosity changes of the heavy oil in situ provide advantages for fracking operations. Heavy oil can serve as non-Newtonian fracturing fluid for sensitive formations, such as gas and tight gas reservoirs. Heavy oil has greater viscosity to serve as an advantageous proppant carrier compared to certain existing oil-based fracturing fluids and water-based fracturing fluids. This increased viscosity can create single dominant fractures in situ with less leak-off of the fracturing fluid. Heavy oil fracturing fluids of the present disclosure, unlike water-based fracturing fluids, have no damaging effects to hydrocarbon-bearing reservoirs with respect to hydrocarbon production and permeability of formation rock.

As described throughout, heavy oil can include tars, optionally mixed with lighter oils, or bitumen, optionally mixed with lighter oils, that can achieve a required viscosity range for a fracturing fluid. The American Petroleum Institute ("API") gravity is a measure of how "heavy" or "light" a petroleum liquid is. The relationship between API gravity and specific gravity ("SG") at 60° Fahrenheit ("° F.") is API=(141.5/SG)−131.5. Crude oil from Saudi Arabia with API gravity greater than about 32 is called Arabian light or "AL" and crude oil with API gravity lesser than about 28 is called Arabian heavy or "AH." In some embodiments, heavy oil as applied as a fracturing fluid in systems and methods described here has an API gravity measure between about 10 and about 20, for example, about 15. In some embodiments, heavy oil used as a fracturing fluid in the disclosed systems and methods is not mixed with oil components with an API gravity greater than 20 or greater than about 25. Heavy oil components can be mixed together to form a mixed heavy oil fracturing fluid, for example, any one of or any combination of tar, bitumen, and asphaltenes.

Various examples have shown the success of heavy oil as a fracturing fluid, such as the reduction in viscosity at elevated temperatures in situ, which reduces formation rock breakdown pressure. Reduced breakdown pressure allows for lesser horsepower pumps to be used in hydraulic fracturing, and this reduces the cost of hydraulic fracking operations. Advantageously, the reduced viscosity of heavy oil at elevated temperatures in formations is also sufficient for adequate proppant suspension, carrying, and in situ proppant placement.

In certain embodiments of the present disclosure, heavy oil used for hydraulic fracturing includes one or more resin, which can coat proppants, such as sand, to prevent proppant flow back after proppant placement in hydraulically-generated fractures. These resins are inherent to certain heavy oils as part of the composition and are referred to as petroleum resins. A suitable resin content can be arrived at applying the saturate, aromatic, resin, and asphaltenes (SARA) content analysis of the heavy oil.

Heavy oil can replace ordinary fracturing fluids, as it is a non-Newtonian fluid, with some embodiments including resins (either produced with and in the heavy oil from a formation in addition to or alternative to added to the heavy oil as an additive), which will coat proppants at the reservoir temperature in situ.

Heavy oil is also formation fluid compatible, or in other words little to no damage is caused to the formation, and the relative permeabilities to hydrocarbons remain unaffected. Heavy oil fracturing fluids of the present disclosure are compatible with the formation fluids and eliminate formation damage, clay swelling, dissolution, water blocking, emulsion formation, and precipitation, which causes plugging in formations. These qualities make heavy oil a desirable fracturing fluid. Crosslinkers can be added to the fluids to increase the viscosity; however, in certain embodiments of the present disclosure heavy oil can be substantially untreated, unmodified, unprocessed, in addition to or alternative to taken for use as a fracturing fluid directly from a producing formation. Optionally, heavy oil can be separated from lighter components and water, but is otherwise substantially untreated, unmodified, and unprocessed.

Fracturing experiments described as follows were performed using 2 inch ("in.") by 2 in. Scioto tight sandstone cores at room temperature and increased temperature (27° Centigrade ("° C.") and 85° C., respectively). Various results have shown the success of heavy oil as a fracturing fluid with advantageous properties, such as significant viscosity decrease, for example, about 90% decrease, at increased temperature, minimum to no formation damage, and stability of heavy oil at increased temperatures. The pressure profiles and breakdown pressures were recorded and are discussed with further regard to the Figures.

The viscosity of heavy oil at a reservoir temperature decreases compared to viscosity at surface conditions, and decreased viscosity in situ allows proppant settling into hydraulically-generated fractures, and the less viscous heavy oil can be flowed back without flowing back proppant particles. Other oil-based fracturing fluids, for example, including diesel, gasoline, or kerosene, do not have advantageous viscosity properties to allow for proppant carrying and placement without multiple additives being used in the oil-based fracturing fluids. Here, by applying heavy oil as a fracturing fluid no additives or processing are required, particularly with regard to viscosity modification.

Importantly, greater viscosity of heavy oil during pumping and decreased viscosity after contacting the reservoir, for example, for a few hours to increase temperature, first allows suitable proppant suspension and carrying followed by proppant settling out of reduced viscosity heavy oil in the fractures of the formation. Afterwards, reduced viscosity heavy oil flows back leaving proppant disposed in created fractures, optionally for recycle of the heavy oil for secondary use as a fracturing fluid. The heavy oil can be flowed back by itself or with a production hydrocarbon.

Thus, disclosed here is a method for hydraulically fracturing a hydrocarbon-bearing formation, the method including injecting into the hydrocarbon-bearing formation under increased pressure a heavy oil fracturing fluid; allowing the heavy oil fracturing fluid to remain in situ for a period of time suitable to create fractures in the hydrocarbon-bearing reservoir, the heavy oil fracturing fluid operable to undergo an at least about 70% viscosity decrease in situ; and flowing back the heavy oil fracturing fluid to the surface without damaging the hydrocarbon-bearing formation or reducing production of hydrocarbons from the hydrocarbon-bearing formation.

In some embodiments, the heavy oil fracturing fluid is operable to undergo an at least about 90% viscosity decrease in situ. Still in other embodiments, the at least about 70% viscosity decrease in situ allows for an at least about 30% reduction in breakdown pressure of a rock matrix in the hydrocarbon-bearing formation versus breakdown pressure applying a fracturing fluid at viscosity conditions of the heavy oil fracturing fluid at surface conditions. Still in other embodiments, the at least about 90% viscosity decrease in situ allows for an at least about 40% reduction in breakdown pressure of a rock matrix in the hydrocarbon-bearing formation versus breakdown pressure applying a fracturing fluid at viscosity conditions of the heavy oil fracturing fluid at surface conditions.

In some embodiments, the heavy oil fracturing fluid consists of separated, but otherwise unprocessed and unmodified produced heavy oil. In other embodiments, the heavy oil fracturing fluid consists of separated, but otherwise unprocessed produced heavy oil mixed with a proppant. Still in other embodiments, the heavy oil fracturing fluid consists essentially of separated, but otherwise unprocessed produced heavy oil. In yet other embodiments, the heavy oil fracturing fluid consists essentially of separated, but otherwise unprocessed produced heavy oil mixed with a proppant. Still in other embodiments, the method includes the step of recycling the heavy oil fracturing fluid after the step of flowing back for use in further hydraulic fracturing operations.

In certain other embodiments, at least about 90% of the heavy oil fracturing fluid is flowed back and recycled avoiding damage to the hydrocarbon-bearing formation. Still in other embodiments, the heavy oil fracturing fluid has an API gravity less than about 20. In other embodiments, the heavy oil fracturing fluid comprises tar, bitumen, or combinations thereof. In some embodiments, the heavy oil fracturing fluid is mixed with a lighter oil with an API gravity greater than about 20 to form a mixed heavy oil fracturing fluid with an API gravity measure between about 10 and 20. Still in other embodiments, the viscosity of the heavy oil fracturing fluid at the surface at about room temperature and atmospheric pressure is between about 350 centipoise ("cP") to about 1,000 cP.

In other embodiments, the method includes the step of suspending proppant in the heavy oil fracturing fluid for carrying to and placement in the fractures. In some embodiments, the viscosity of the heavy oil fracturing fluid in the hydrocarbon-bearing reservoir is between about 20 cP to about 100 cP at a temperature between about 40° C. and about 120° C. Still in other embodiments, the method includes a step of selecting the heavy oil for injecting based at least in part on the concentration of petroleum resins inherent to the heavy oil to prevent proppant flowback and enhance proppant retention in fractures and to improve both fracture conductivity along with fracture penetration and half length. In some embodiments, a suitable unmodified and unprocessed heavy oil fracturing fluid has a resin content between about 5 weight percent (wt. %) and about 20 wt. %, or between about 7 wt. % and about 10 wt. % based on a saturate, aromatic, resin, and asphaltenes (SARA) content analysis of the unmodified and unprocessed heavy oil fracturing fluid. In some embodiments, the period of time suitable to create fractures in the hydrocarbon-bearing reservoir is between about 1 hour and about 5 hours, or about 2 or about 3 hours.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of compositions, systems, and methods for heavy oil hydraulic fracturing, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Breakdown pressure of a rock formation is the pressure at which a fracture will be created in the formation. Determination of breakdown pressure and fracture analysis is important for drilling operations in the areas of Leak-Off Test ("LOT") analysis and casing design. Viscosity of a fracturing fluid plays a role in the breakdown pressure of rock in a hydrocarbon-bearing rock formation. Viscosity and breakdown pressure have a power relation. Generally, as viscosity increases the breakdown pressure also increases. This occurs due, in part, to the resistance caused by the viscous fluid against the downhole equipment and the rock formation (discussed further with regard to FIGS. 7 and 8). The ability of fluid to leak off into a porous formation is another contributing factor to variation in breakdown pressures. As fluid leaks into a formation, the formation becomes partially weaker, and the leaked fluid becomes a channel for the pressure to propagate into the formation. This allows a larger area to be accessed by the fluid consequently reducing required breakdown pressure.

Figure 1:
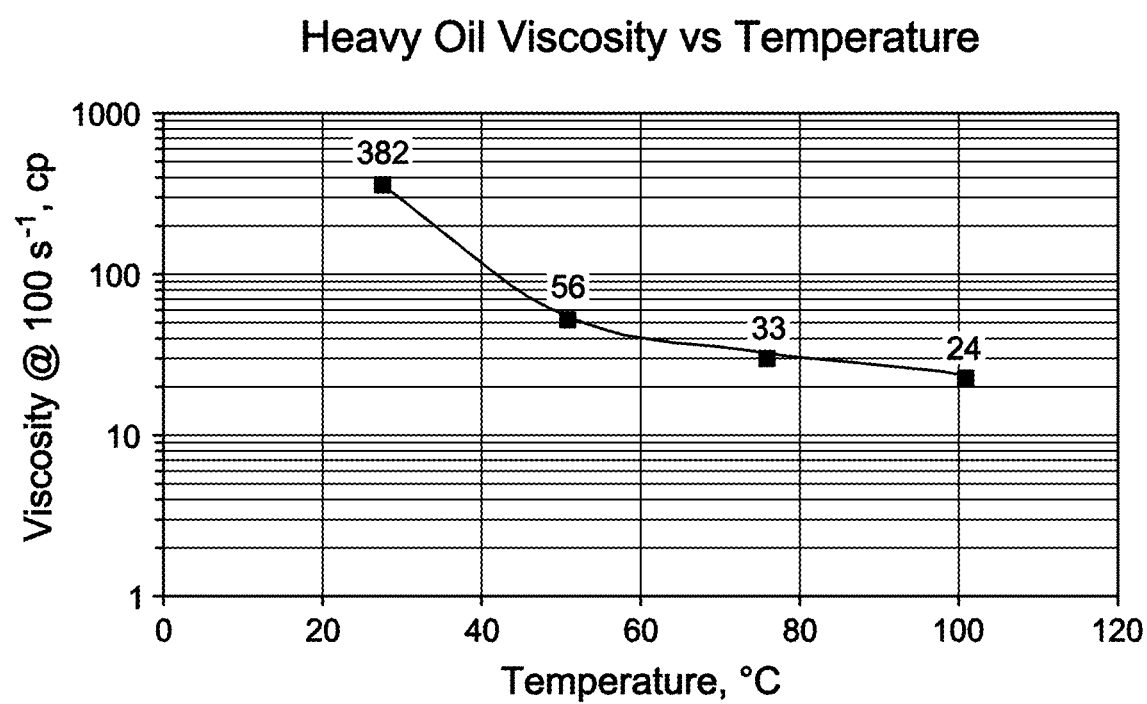
FIG. 1 is a graph showing decrease in heavy oil viscosity with temperature.

Rheology determining tests were performed on heavy oil fluid samples at varying temperatures using an Anton Par Rheometer MCR 302 to achieve a viscosity-temperature profile. FIG. 1 is a graph showing decrease in heavy oil viscosity with temperature. As shown by FIG. 1, viscosity of the tested heavy oil is 382 centipoise ("cP") at room temperature (27° Centigrade ("° C.")). As soon as heat is supplied, a significant drop in viscosity is seen (56 cP at 50° C.). As the temperature is further increased, the viscosity drops down to 24 cP at 100° C. As will be discussed further, viscosity, based in part on temperature, will impact rock breakdown pressure in situ.

As described throughout, heavy oil can include tars, optionally mixed with lighter oils, or bitumen, optionally mixed with lighter oils, that can achieve a required viscosity range for a fracturing fluid. The American Petroleum Institute ("API") gravity is a measure of how "heavy" or "light" a petroleum liquid is. The relationship between API gravity and specific gravity ("SG") at 60° F. is API=(141.5/SG)−131.5. Crude oil from Saudi Arabia with API gravity greater than about 32 is called Arabian light or "AL" and crude oil with API gravity lesser than about 28 is called Arabian heavy or "AH."

Suitable viscosity ranges for a heavy oil fracturing fluid will depend on a variety of factors including, for example, well depth for fracking. In shallow wells (depths less than about 10,000 feet ("ft.")) a surface viscosity range of about 350 cP or 500 cP to about 1,000 cP will be suitable to suspend and carry proppant from the surface to pressure-generated fractures, and will also be suitable to create the necessary pressure-generated fractures. As noted, downhole viscosity of heavy oil decreases once it contacts the reservoir where temperature is increased. For example, if reservoir temperature is about 100° C. for a shallow well, the heavy oil viscosity will drop to less than about 30 cP after a period of time of about 2 hours, which is enough time to propagate fractures and settle out the proppant. Suitable, but optional, proppants for use with heavy oil of the present disclosure include, but are not limited to, sand and ceramic proppants.

For deep wells (depths greater than about 10,000 ft.) where in situ temperatures can reach and exceed 150° C., surface viscosity of the heavy oil can be greater than about 1000 cP. This surface viscosity allows for initiation and propagation of fractures when the heavy oil is under increased temperature and pressure in situ. The viscosity can drop to less than about 20 cP at a reservoir temperature of about 150° C., which will make it easy to flow back out of a hydrocarbon-bearing reservoir.

Breakdown Pressure Tests

Figure 2:
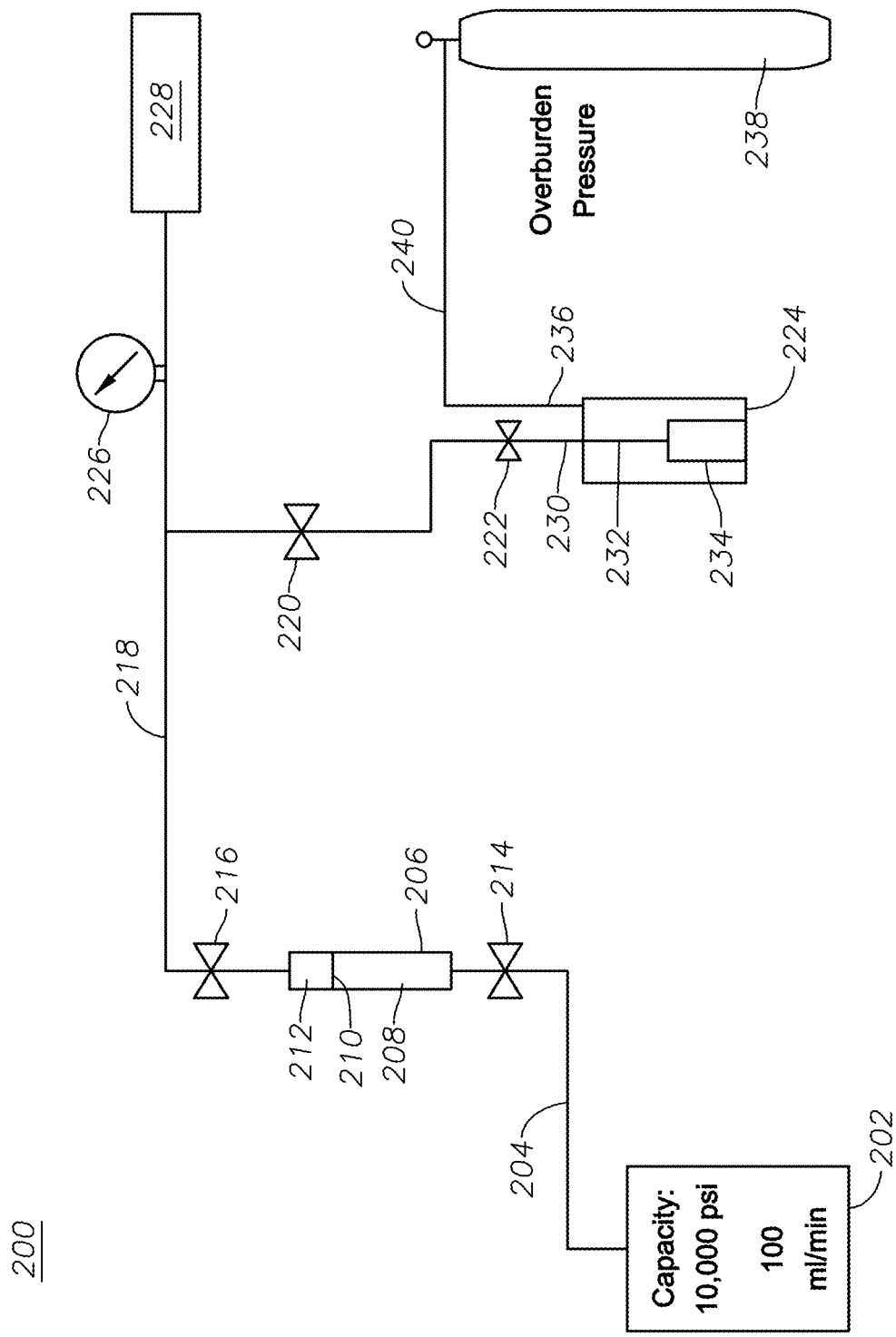
FIG. 2 is a schematic of a test arrangement for testing breakdown pressure of certain formation rock samples.
Figure 3:
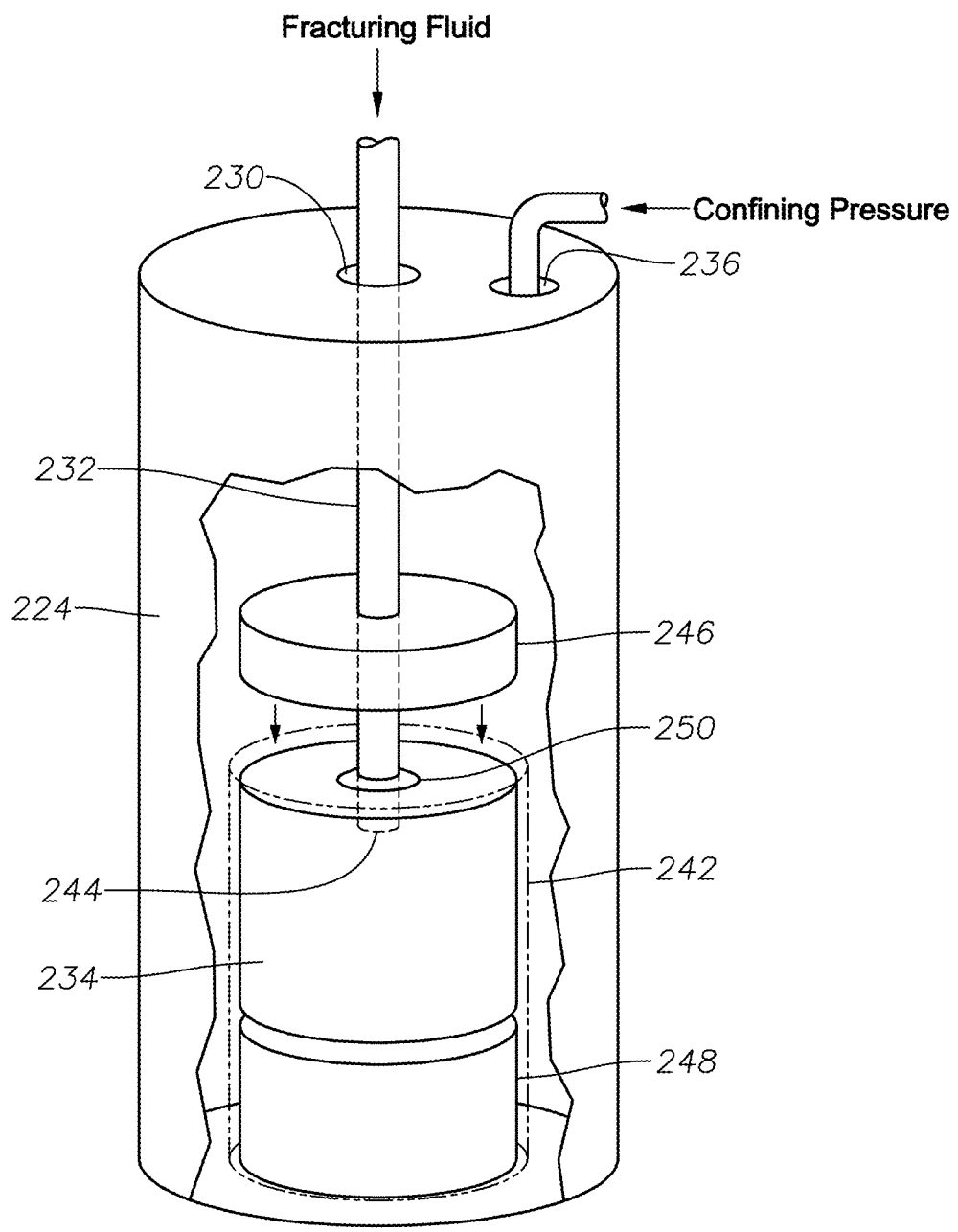
FIG. 3 is a schematic of a fracturing cell for testing breakdown pressure of certain formation rock samples, also shown in the schematic of FIG. 2.

FIG. 2 is a schematic of the test arrangement for testing breakdown pressure of certain formation rock samples. FIG. 3 is a schematic of a fracturing cell for testing breakdown pressure of certain formation rock samples, also shown in the schematic of FIG. 2.

Apparatus of FIGS. 2 and 3 were designed to conduct fracturing experiments on rocks. Referring now to FIG. 2, in breakdown pressure testing system 200 an ISCO pump 202 with a pumping capacity of 10,000 pounds per square inch gauge ("psig") and 100 milliliters per minute ("mL/min") provides pumping pressure by pumping distilled water via line 204 to a fluid accumulator 206 with distilled water chamber 208 which, by means of a piston 210, pushes and displaces fracturing fluid 212. Valves 214, 216 control fluid flow to and from fluid accumulator 206, respectively. Fracturing fluid 212 leaving fluid accumulator 206 by line 218 proceeds past fluid bleeding vent valve 220 and valve 222 into a fracturing cell 224. Fluid 212 leaving fluid accumulator 206 by line 218 also proceeds towards a pressure gauge 226 and pressure recording system including a transducer 228. An ageing cell was modified to hold rock samples in order to perform tests with fracturing cell 224. Two inlets were drilled on top of fracturing cell 224; central inlet 230 to inject fracturing fluid via tubing 232 into core sample 234, and offset inlet 236 to provide confining pressure, nitrogen gas, from tank 238 via line 240. Fracturing cell 224 is described with further regard to FIG. 3.

Fracturing experiments were performed to determine breakdown pressure of rock under various conditions of temperature and viscosity of fracturing fluid. First, breakdown pressure testing system 200 was flushed using toluene to ensure the system was free of impurities, which could affect test results. Then fracturing fluid 212 was placed in fluid accumulator 206, and all lines were fluidly connected. Fluid was bled from valves 214, 216, 220, 222 and all fittings to ensure breakdown pressure testing system 200 was filled with the heavy oil at issue to be tested. To ensure there were no leaks in breakdown pressure testing system 200, a pressure of 1500 psig was applied. Core sample 234, 2 inches in diameter, was then placed in a rubber sleeve 242 (shown in FIG. 3) and tightened at the ends to isolate it from confining fluid ($N_2$) in fracturing cell 224. Fracturing fluid 212 was pumped by means of syringe into a 0.25 inch diameter borehole 244 in core sample 234 to remove air from borehole 244.

Next, ISCO pump 202 was activated, and core sample 234 was connected to the lines, including tubing 232. This was also performed to ensure no air was present in breakdown pressure testing system 200. Confining pressure was then applied to fracturing cell 224 by $N_2$ from tank 238 via line 240. Finally, fracturing fluid 212 was pumped by ISCO pump 202, and the pressure in core sample 234 built up until core sample 234 was fractured. Referring to FIG. 3, core sample 234 was enclosed within fracturing cell 224 by a top spacer 246, a bottom spacer 248, and epoxy 250 around tubing 232.

Experiments were performed to compare the breakdown pressure of the heavy oil at varying temperatures and viscosities. In one test heavy oil was kept at room temperature, about 27° C., and in another test fracturing with heavy oil was performed at elevated temperature, about 85° C. The type of rock used was Scioto tight sandstone rock with permeability and porosity of 1 millidarcy ("mD") and 13%, respectively. The injection rate was kept constant at 3 mL/min and confining pressure was 100 psig. Rock type, injection rate, and confining pressure were kept the same for both tests. Other pressures could be chosen as confining, and generally increasing the confining pressure will increase the required pumping pressure to break down the rock.

Figure 4:
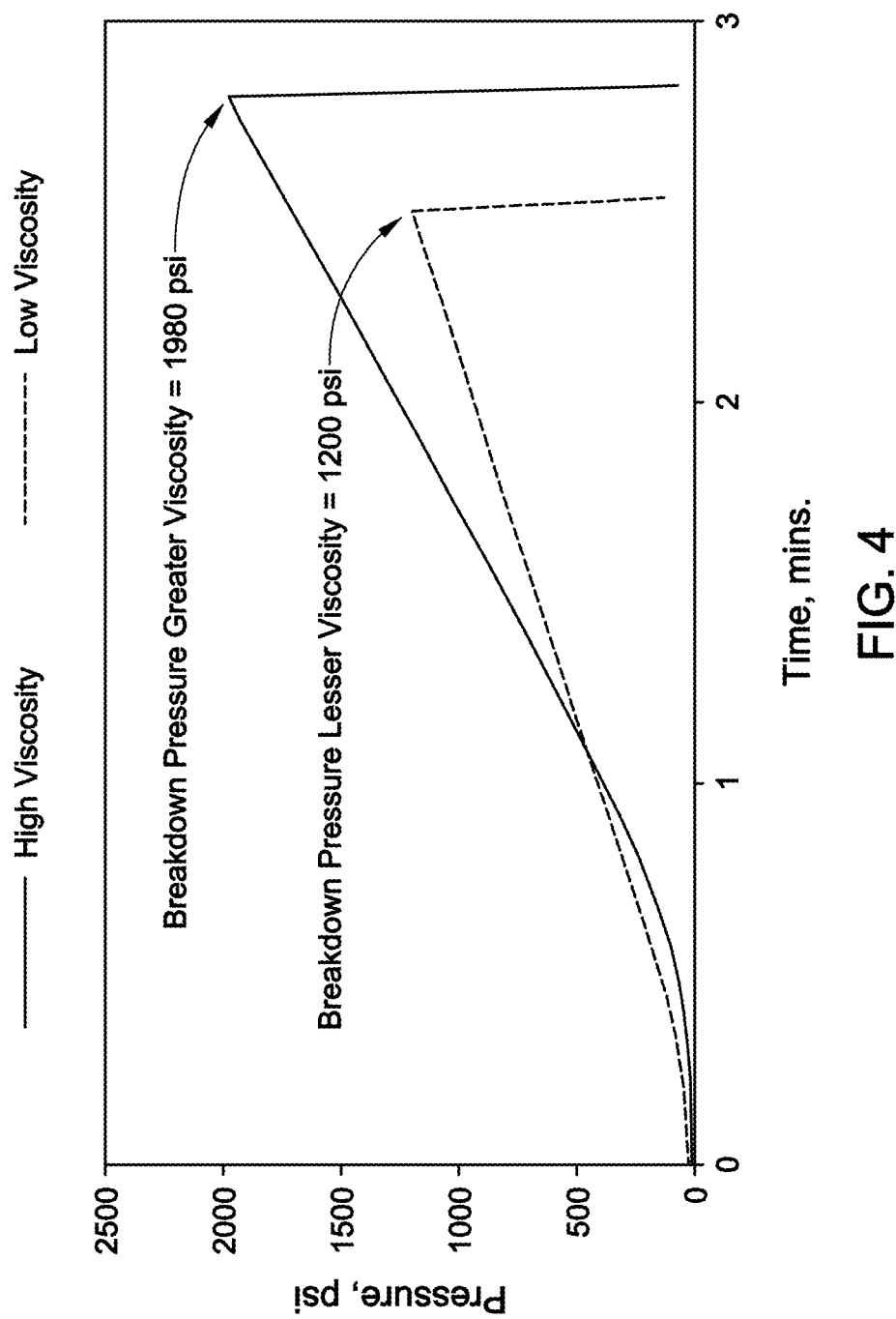
FIG. 4 is a graph showing breakdown pressure curves for Scioto sandstone rocks using heavy oil as fracturing fluid with different viscosities at different temperatures.

FIG. 4 is a graph showing breakdown pressure curves for Scioto sandstone rocks using heavy oil as fracturing fluid with different viscosities at different temperatures. Based on the performed experiments, fractures were induced in the samples at increased pressures. FIG. 4 shows the breakdown pressure curve using heavy oil at room temperature ("Greater Viscosity") and the breakdown pressure curve using heavy oil at increased temperature ("Lesser Viscosity"). At greater viscosity, the pressure builds non-linearly for 30 seconds. This is due, in part, to the borehole 244 being filled and saturated by the oil. Once borehole 244 is filled, pressure builds linearly exerting force on the walls of borehole 244. Pressure increases further causing borehole 244 to expand until a fracture is induced.

Figure 5B:
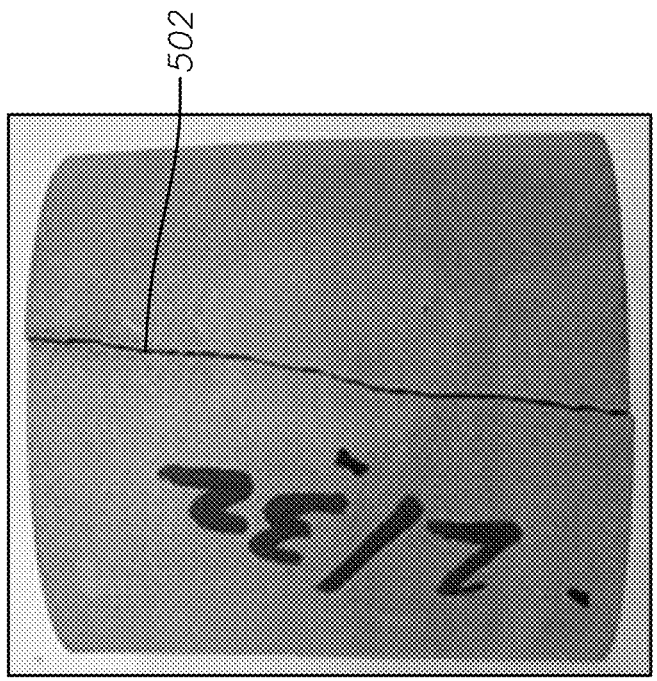
FIGS. 5A and 5B show fracture profiles of tested rock samples fractured with heavy oil as a fracturing fluid in the present disclosure.
Figure 5A:
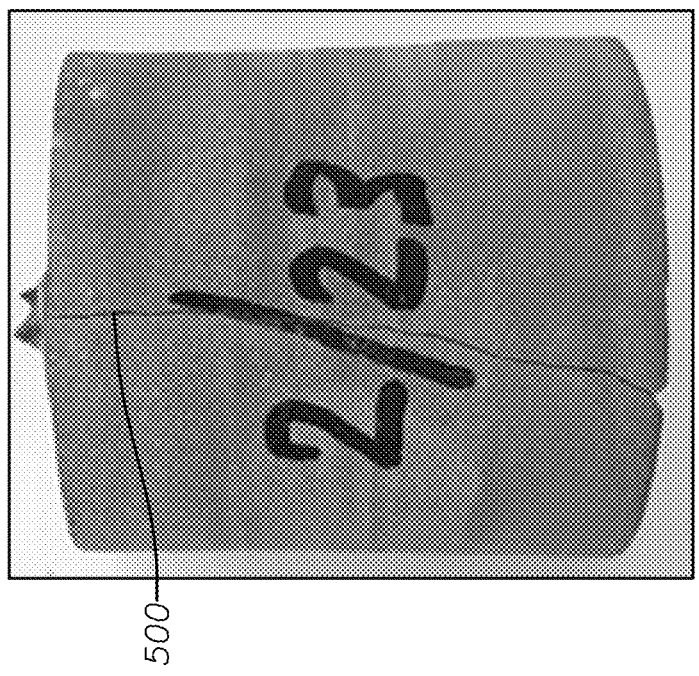

As soon as a fracture is induced, a pressure drop is seen in FIG. 4 due to increased surface area and release of pressure. The greatest pressure achieved just before the pressure decrease was 1980 psig, and this is referred to as the breakdown pressure. The induced fracture 500 was bi-wing and parallel to the bedding plane, as shown in FIG. 5A. FIGS. 5A and 5B show fracture profiles of tested rock samples fractured with heavy oil as a fracturing fluid in the present disclosure.

FIG. 4 also shows the breakdown pressure curve for a rock sample when heavy oil was applied at increased temperature ("Lesser Viscosity") as fracturing fluid. The pressure buildup was slower than in the greater viscosity test, due in part to greater leak-off of the fluid. Breakdown pressure was significantly reduced and was recorded to be 1200 psi, which is a 40% decrease as compared to the heavy oil at room temperature. Fracture 502 is shown in FIG. 5B.

Figure 6:
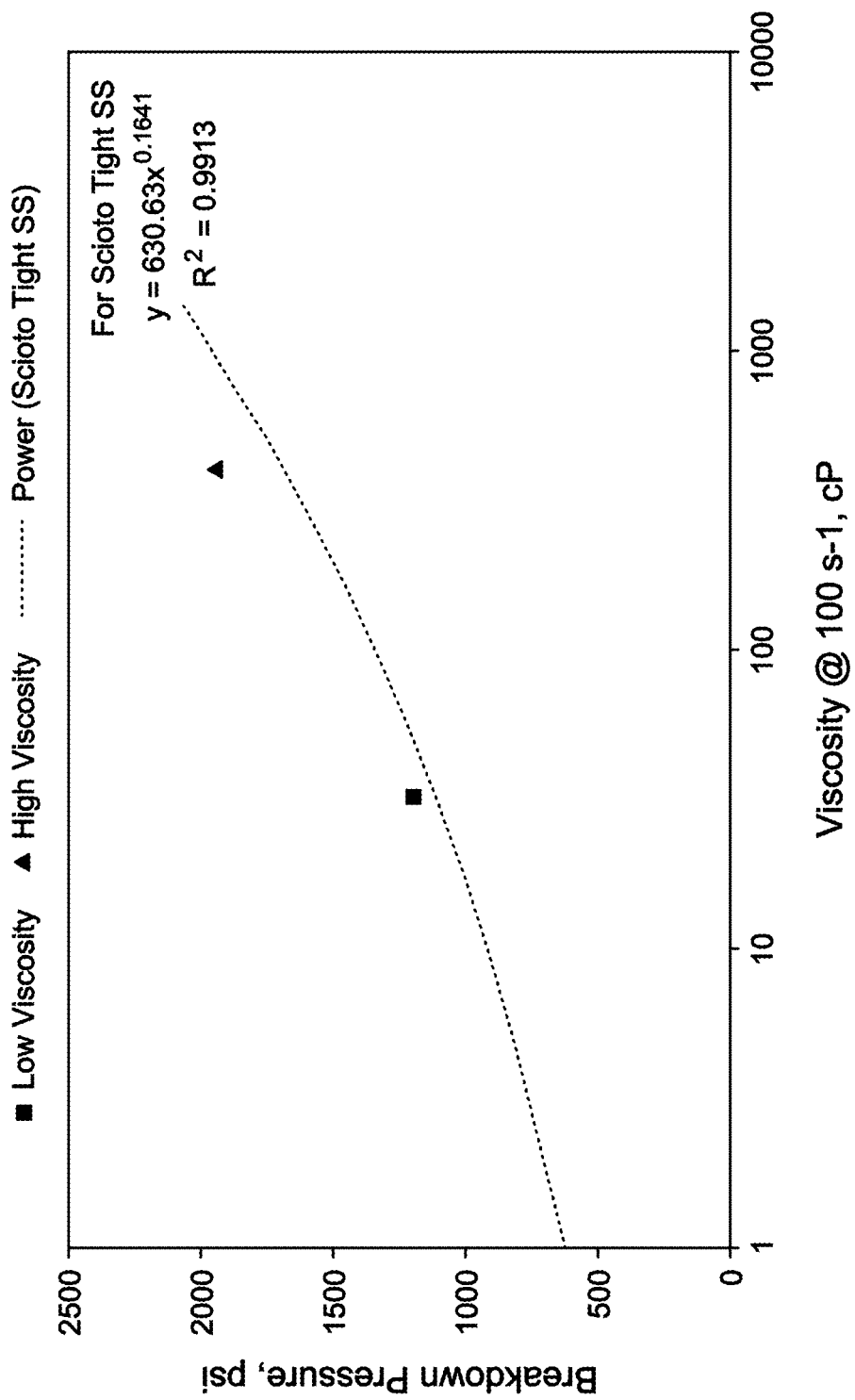
FIG. 6 is a graph showing breakdown pressures with a fit line for Scioto sandstone rocks using heavy oil as a fracturing fluid with different viscosities at different temperatures.
Figure 7:
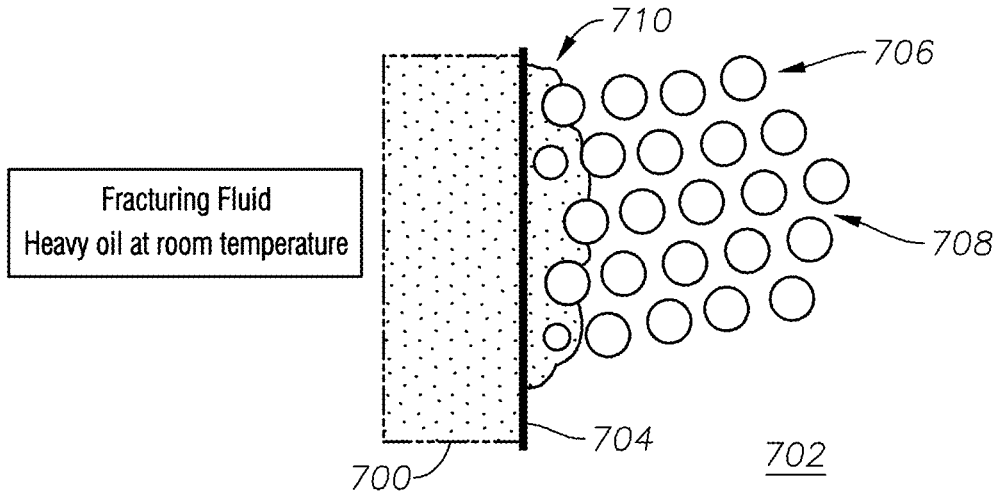
FIG. 7 is a diagram showing the near-wellbore effect of a greater viscosity fracturing fluid.
Figure 8:
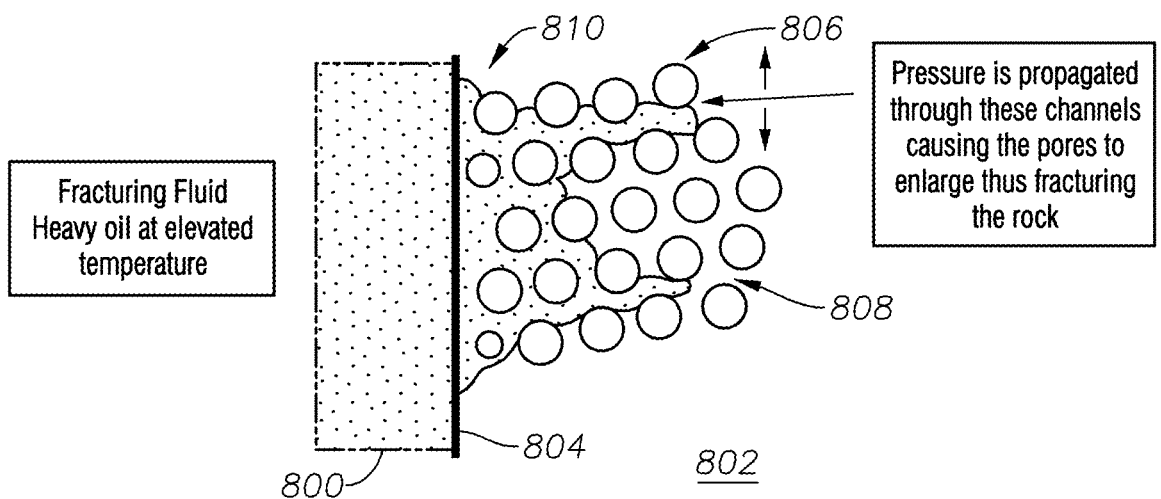
FIG. 8 is a diagram showing the near-wellbore effect of a lesser viscosity fracturing fluid.

FIG. 6 is a graph showing breakdown pressures with a fit line for Scioto sandstone rocks using heavy oil as a fracturing fluid with different viscosities at different temperatures. FIG. 7 is a diagram showing the near-wellbore effect of a greater viscosity fracturing fluid. FIG. 8 is a diagram showing the near-wellbore effect of a lesser viscosity fracturing fluid. The dependence of breakdown pressure on viscosity is explained, in part, by the invasion of fracturing fluid into a rock formation. In FIG. 7, greater viscosity fracturing fluid is hindered with respect to penetration into the pores of the rock. As seen in FIG. 7, greater viscosity oil only invades a small area of the rock. In borehole 700, disposed in rock formation 702, a borehole wall 704 is disposed between a rock matrix 706, including pores 708, and borehole 700. Fracturing fluid 710, viscous heavy oil at room temperature, is shown as not deeply penetrating rock matrix 706 and pores 708 a significant distance from borehole wall 704.

In FIG. 8, lesser viscosity fracturing fluid at increased temperature proceeds unhindered with respect to penetration into the pores of the rock. As seen in FIG. 8, lesser viscosity oil invades a greater area of the rock. In borehole 800, disposed in rock formation 802, a borehole wall 804 is disposed between a rock matrix 806, including pores 808, and borehole 800. Fracturing fluid 810, less viscous heavy oil at increased temperature, is shown as deeply penetrating rock matrix 806 and pores 808 a significant distance from borehole wall 804. As fracturing fluid 810 propagates through pores 808, the pores enlarge due to pressure, and the rock matrix 806 is caused to crack. As the fracturing fluid 810 penetrates deeper into the rock matrix 806 via pores 808, a path for the pressure to be transferred to the invasion zone through these channels is established. As a result, the rock fractures at a lesser breakdown pressure.

As noted, in embodiments of the present disclosure no additives are required for heavy oil, such as cross-linkers, viscosifiers, fluid-loss control fluids, or surfactants. Viscosity of heavy oil, such as bitumen and tar, can be initially controlled via admixture with a less viscous hydrocarbon, such as light oil. Temperature affects the viscosity of heavy oil in situ, and generally deeper and greater pressure reservoirs will decrease the viscosity of the heavy oil more than shallower and lesser temperature reservoirs. Heavy oil of the present disclosure need not be modified or processed, and can be pumped and injected as produced heavy oil soon after its production.

Heavy oil fracking methods of the present disclosure allow up to 100% recycle of the fracking fluid, and it can be used in different fracture stages in multi-stage fracturing and also in other wells, not only in the same well with different stages. If the heavy oil is contaminated with sand, soil, rock, or other materials once returned to the surface, it can be centrifuged or heated to remove the sand.

Apart from achieving reduced in situ breakdown pressure via reduced viscosity (allowing for lesser pressure surface hydrofracking pumps), heavy oil is a formation compatible fluid. As the fracturing fluid is injected downhole to fracture a formation, the fluid intimately contacts the formation and penetrates rock pores as explained previously. After fractures are created, the fluid sets itself on the surface of the fractures. However, heavy oil is also easily removed from the fracture surfaces. Failure to achieve this, for example, with water-based fracking fluids, causes the well to produce uneconomically or to not produce at all. Heavy oils of the present disclosure can be used in a wide temperature range from about 50° C. to about 200° C., where the in situ temperature of the hydrocarbon-bearing formation is between about 50° C. to about 200° C., and at depths from about 2,000 ft. or about 5,000 ft. to about 15,000 ft. The compositions and methods can be applied to both oil and gas wells in conventional and unconventional reservoirs.

Applied surface pressure from hydraulic fracturing pumps can range from about 1,000 psig to about 10,000 psig, and this is based in part on the well depth, well temperature, and initial viscosity and reduced viscosity in situ of the heavy oil fracturing fluid. In some embodiments, to create a single fracture of half-length of 50 ft. a time of about 1 to about 3 hours will be required. In yet other embodiments, the in situ temperature of the hydrocarbon-bearing formation is at least about 100° C. Still in other embodiments, the depth of the hydrocarbon-bearing reservoir is between about 5,000 feet ("ft.") and about 15,000 ft. In certain other embodiments, the step of injecting includes the use of at least one hydraulic fracturing pump operating at between about 1,000 pounds per square inch gauge ("psig") and about 10,000 psig.

Various examples have shown the surprising and unexpected successes and advantages of heavy oil as a fracturing fluid, such as the reduction in viscosity at elevated temperatures and depths, which helps reduce required breakdown pressures of rock matrices in situ. Reduced breakdown pressure translates to lesser horsepower pumps required for hydraulic fracturing and reduced cost of operations. However, viscosity of heavy oil at elevated temperatures is still sufficient for adequate proppant suspension, carrying, and placement.

Heavy oil is also a formation compatible fluid, or in other words little to no damage is caused to the formation with the relative permeabilities of the formation remaining unaffected. In some embodiments because additional components could negatively impact the compositions of heavy oil applied in the fracturing methods, the heavy oil compositions consist only of produced heavy oil or consist essentially of produced heavy oil, optionally in combination with lighter oils. In some embodiments because additional components could negatively impact the compositions of heavy oil applied in the fracturing methods, the heavy oil compositions consist only of produced heavy oil and proppant or consist essentially of produced heavy oil and proppant.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of compositions, systems, and methods for heavy oil hydraulic fracturing, as well as others, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for hydraulically fracturing a hydrocarbon-bearing formation, the method comprising the steps of:
injecting into the hydrocarbon-bearing formation under increased pressure a heavy oil fracturing fluid, where the heavy oil fracturing fluid consists essentially of unprocessed and unmodified produced heavy oil separated from water and mixed with a proppant without cross-linkers, viscosifiers, fluid-loss control fluids, or surfactants;
allowing the heavy oil fracturing fluid to remain in situ for a period of time suitable to create fractures in the hydrocarbon-bearing reservoir, the heavy oil fracturing fluid operable to undergo an at least about 70% viscosity decrease in situ; and
flowing back the heavy oil fracturing fluid to the surface without damaging the hydrocarbon-bearing formation or reducing production of hydrocarbons from the hydrocarbon-bearing formation.

2. The method according to claim 1, where the heavy oil fracturing fluid is operable to undergo an at least about 90% viscosity decrease in situ.

3. The method according to claim 1, where the at least about 70% viscosity decrease in situ allows for an at least about 30% reduction in breakdown pressure of a rock matrix in the hydrocarbon-bearing formation versus breakdown pressure applying a fracturing fluid at viscosity conditions of the heavy oil fracturing fluid at surface conditions.

4. The method according to claim 2, where the at least about 90% viscosity decrease in situ allows for an at least about 40% reduction in breakdown pressure of a rock matrix in the hydrocarbon-bearing formation versus breakdown pressure applying a fracturing fluid at viscosity conditions of the heavy oil fracturing fluid at surface conditions.

5. The method according to claim 1, where the heavy oil fracturing fluid consists of unprocessed and unmodified produced heavy oil.

6. The method according to claim 1, where the heavy oil fracturing fluid consists of unprocessed and unmodified produced heavy oil mixed with a proppant.

7. The method according to claim 1, where the heavy oil fracturing fluid consists essentially of unprocessed and unmodified produced heavy oil.

8. The method according to claim 1, further comprising the step of recycling the heavy oil fracturing fluid after the step of flowing back for use in further hydraulic fracturing operations.

9. The method according to claim 1, where at least about 90% of the heavy oil fracturing fluid is flowed back and recycled avoiding damage to the hydrocarbon-bearing formation.

10. The method according to claim 1, where the heavy oil fracturing fluid has an American Petroleum Institute ("API") gravity less than about 20.

11. The method according to claim 1, where the heavy oil fracturing fluid comprises tar, bitumen, asphaltenes, or combinations thereof.

12. The method according to claim 1, where the viscosity of the heavy oil fracturing fluid at the surface at about room temperature and atmospheric pressure is between about 350 centipoise ("cP") to about 1,000 cP.

13. The method according to claim 1, where the step of injecting includes the use of at least one hydraulic fracturing pump operating at between about 1,000 pounds per square inch gauge ("psig") and about 10,000 psig.

14. The method according to claim 1, further comprising the step of suspending proppant in the heavy oil fracturing fluid for carrying to and placement in the fractures.

15. The method according to claim 1, where the viscosity of the heavy oil fracturing fluid in the hydrocarbon-bearing reservoir is between about 20 centipoise ("cP") to about 100 cP at a temperature between about 40° C. and about 120° C.

16. The method according to claim 1, further comprising a step of selecting the heavy oil for injecting based at least in part on the concentration of petroleum resins inherent to the heavy oil to prevent proppant flowback and enhance proppant retention in fractures and to improve both fracture conductivity along with fracture penetration and half length.

17. The method according to claim 16, where the concentration of petroleum resins inherent to the heavy oil is between about 5 weight percent (wt. %) and about 20 wt. % based on a saturate, aromatic, resin, and asphaltenes (SARA) content analysis of the heavy oil.

18. The method according to claim 17, where the concentration of petroleum resins inherent to the heavy oil is between about 7 wt. % and about 10 wt. % based on a SARA content analysis of the heavy oil.

19. The method according to claim 1, where the period of time suitable to create fractures in the hydrocarbon-bearing reservoir is between about 1 hour and about 5 hours.

* * * * *